Dec. 22, 1964 J. J. LENTZ 3,162,717
COMPACT TRANSMISSION LINE CONSISTING OF INTERLEAVED
CONDUCTOR STRIPS AND SHIELD STRIPS
Filed March 20, 1962

INVENTOR
JOHN J. LENTZ
BY Elmer W. Galbi[illegible]
ATTORNEY

United States Patent Office 3,162,717
Patented Dec. 22, 1964

3,162,717

COMPACT TRANSMISSION LINE CONSISTING OF INTERLEAVED CONDUCTOR STRIPS AND SHIELD STRIPS

John J. Lentz, Chappaqua, N.Y., assignor to International Business Machines Corporation, New York, N.Y., a corporation of New York Filed Mar. 20, 1962, Ser. No. 181,125
3 Claims. (Cl. 174—36)

This invention relates to superconductor circuitry and more particularly to a transmission line fabricated with superconducting material.

Superconducting circuitry designed in the form of transmission lines in order to achieve high speed is well known. For example, such circuitry is described in U.S. Patent 2,962,681 entitled "Superconductor Circuits" by John J. Lentz. It is also well known that with transmission lines the most satisfactory operation is obtained if the impedance of the transmission line is matched to the impedance of the driving means and of the receiving means.

The characteristic impedance of a conventional transmission line is a function of the width of the transmission line and hence in order to obtain a certain desired characteristic impedance with a conventional transmission line, a transmission line having a particular width is necessary. In high speed devices the time required to transmit a signal from one point to another point becomes important, hence, it is desirable to reduce the total area occupied by the device to the smallest possible physical dimensions and when a high speed device includes a transmission line it is desirable to have the transmission line occupy as small an area as possible.

The present invention is directed at providing a transmission line which electrically appears to be very wide but which is physically narrow. This is achieved by providing a superconducting transmission line wherein each of the two conductors which form the line has a plurality of overlapping layers. This structure results in a transmission line which electrically appears to be wide, but which has relatively small physical dimensions.

An object of the present invention is to provide an improved transmission line.

Another object of the present invention is to provide a transmission line for use with high speed circuitry.

Another object of the present invention is to provide a transmission line for use with high speed cryogenic circuitry.

Yet another object of the present invention is to provide a transmission line which occupies a relatively small physical area.

Still another object of the present invention is to provide a transmission line which has a high ratio of capacitance to inductance per unit length.

The foregoing and other objects, features and advantages of the invention will be apparent from the following more particular description of preferred embodiments of the invention, as illustrated in the accompanying drawings.

Figure 1:
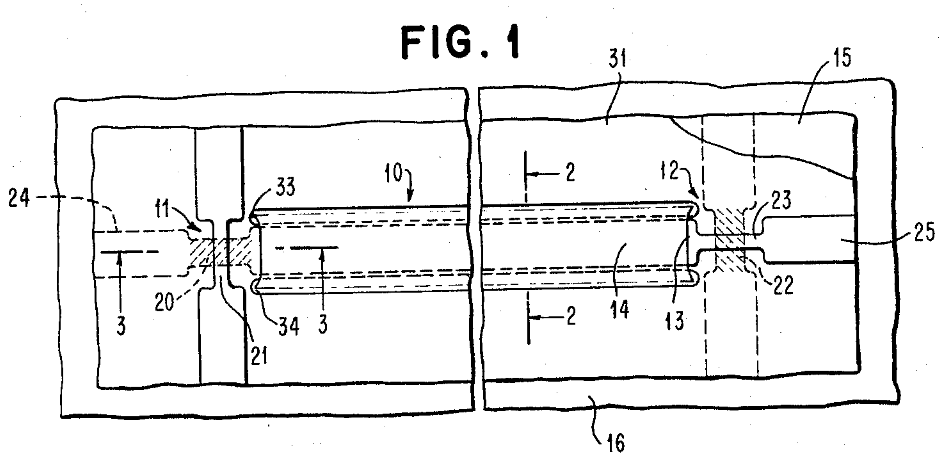
FIGURE 1 is an overall diagram of the first embodiment of the present invention.

FIGURE 1 shows a transmission line 10 with a driver 11 and a receiver 12. The transmission line 10, the driver 11 and the receiver 12 are all deposited on a superconducting ground plane 15 and the superconducting ground plane 15 is deposited on a supporting substrate 16. A sheet of insulating material 31 covers most of the ground plane 15 and it separates the driver 11 and the receiver 12 from the ground plane. The manner in which one conductor of the transmission line is insulated from the ground plane 15 will be seen later.

The transmission line 10 includes an inner conductor 13 and an outer shield 14. Driver 11 comprises a cryotron which has a gate 20 and a control 21 and receiver 12 comprises a cryotron which has a gate 22 and a control 23. The gate 20 of driver 11 is connected in series between the first end of the conductor 13 and a source of current 24 and the control conductor 23 is connected in series between the other end of conductor 13 and a current collecting means 25.

The presence or absence of current in control line 21 controls the state respectively resistive or superconducting of gate 20, and likewise, the presence or absence of current in control line 23 controls the state respectively resistive or superconducting of cryotron gate 22. Signals are applied to the conductor 13 of the transmission line 10 by changing the state of cryotron gate 20. These signals propagate along transmission line 10 and through control 23 thereby controlling the state superconducting or resisting of cryotron gate 22.

Figure 2:
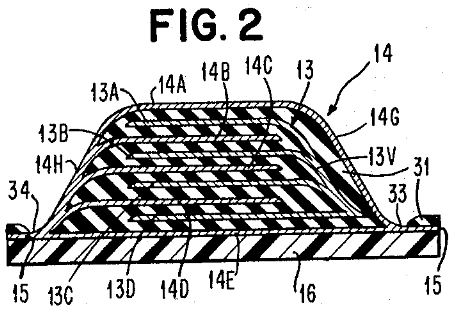
FIGURE 2 is a sectional view of the first embodiment of the invention taken along line 2—2 in FIGURE 1.

As is well known in the art, in order to achieve the best operation, the characteristic impedance of the transmission line 10 must be properly related to the characteristic impedance of driver 11. The impedance of a transmission line is a function of the width of the line (see page 594, Reference Data for Radio Engineers, 4th edition, International Telephone and Telegraph Corporation). Hence, in order to properly relate the characteristic impedance the transmission line 10 and the characteristic impedance of the driver 11 a transmission line having a certain effective width must be used. The present invention provides a transmission line which electrically appears to be relatively wide but which is physically relatively narrow. The first embodiment of the invention achieves this by providing a transmission line where the conductors 13 and the shield 14 which form the transmission line have an "interlocking-E" configuration as shown in FIGURE 2.

The conductor 13 has four horizontal segments 13A, 13B, 13C and 13D and a segment 13V which connects the horizontal segments 13A to 13D along one end. The shield 14 has five horizontal segments 14A to 14E and two vertical segments 14H and 14G. The vertical segments 14H and 14G each connect one end of each of the horizontal segments 14A to 14E. It should be noted that segment 14E is merely an extension or a part of shield 15. The shield 14 and the conductor 13 can conveniently be described as being "E-shaped."

Figure 3:
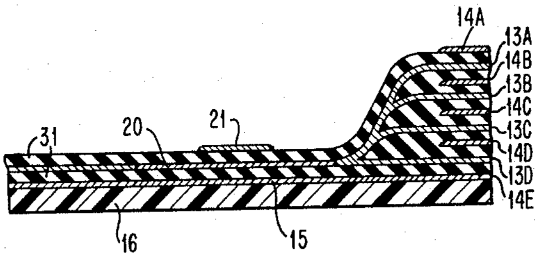
FIGURE 3 is a sectional view of the first embodiment of the invention taken along line 3—3 in FIGURE 1.

Each segment of the conductor 13 is separated and insulated from the adjacent sections of the shield by electrical insulating material 31. The manner in which segments 13A to 13D of conductor 13 are connected to the gate 20 is shown in FIGURE 3. The segments 13A to 13D are joined together and connected to the gate conductor 20. Each of the segments of the shield 14A to 14D terminates a slight distance before the point where the segments 13A to 13D are joined. Segment 14E continues and is joined to and becomes part of shield 15. The gate 20 is separated from the shield 15 by insulation 31 and likewise control 21 is separated from gate 20 by insulation 31.

The construction of the transmission line 10 in the vicinity of the receiver 12 is similar to the construction of the transmission line 10 in the vicinity of driver 11 and hence it is not shown in detail herein.

It should be noted that the term "E-shaped" is herein used to describe a structure such as that of conductor 13 which has more than three horizontal segments. With the structure shown herein the top most segment and the bottom most segment of the transmission line are both part of the same conductor. Equivalent structures could be made where the top most and the bottom most segments are part of different conductors. In such a structure by considering all except the top most segments, one has the same structure as shown herein.

The transmission line is fabricated by successively depositing the layers which comprise the transmission line on substrate 12 by well known vapor deposition techniques. First, a layer of superconducting material is deposited on the substrate 16 to form shield 15 which includes shield segment 14E. Next, a layer of insulation 31 is deposited everywhere on the surface of the substrate except for the two slots 33 and 34 where the segments 14H and 14G of shield 14 are connected to the segment 14E of shield 15. Next segment 13D of conductor 13 is deposited on insulation 31. Next, a layer of insulation is deposited over segment 13D except at its right hand end. Next, a layer of superconducting material is deposited over the insulation to form segment 14D. The material for segment 14D is deposited so as to connect to shield 15 thereby forming part of segments 14H. This procedure continues until the entire structure of the transmission line as shown is formed. The vertical segments 13V and 14H are formed in parts as the various layers are deposited. The last layer of material which is deposited forms shield segments 14G and 14A and a part of segment 14H.

Conductor 13, shield 14 and shield 15 are fabricated from a superconducting material such as lead which has a relatively high threshold. Hence, the conductor 13, the shield 14 and the shield 15 remain superconducting in the environment where the device operates. As is well known in the art the controls 21 and 23 are also fabricated from a superconducting material which has a relatively high threshold and which remains superconductive in the environment wherein the device operates. Gates 21 and 22 are fabricated from a superconducting material which has a relatively low threshold and which can be changed from a superconducting to a resistive state by the magnetic field generated by current in controls 21 and 22. Since the compositions of the materials from which the various components of the present invention are fabricated is well known, no discussion thereof is given herein.

Figure 4:
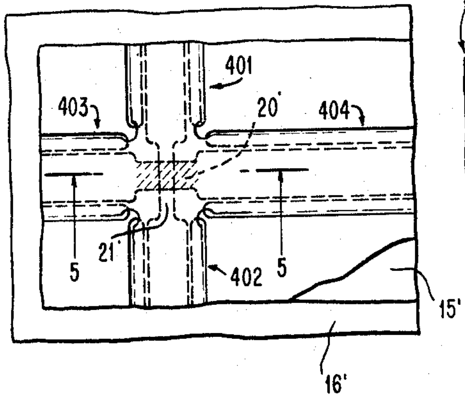
FIGURE 4 is a top view of a second embodiment of the present invention.
Figure 5:
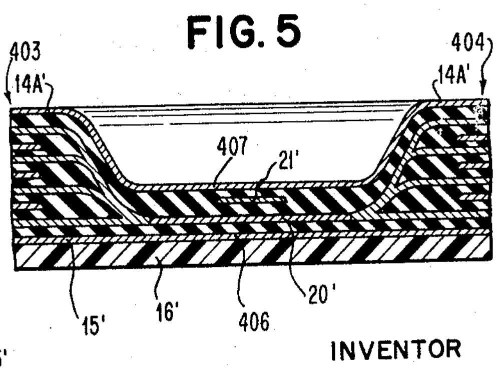
FIGURE 5 is a side view of the second embodiment of the invention.

A second embodiment of the invention is shown in FIGURES 4 and 5. The second embodiment shows two features of the invention not shown in the first embodiment of the invention. First, the second embodiment shows how the invention can be used with doubly shielded circuitry and second, it shows how transmission lines can be interconnected.

The use of doubly shielded circuitry to reduce the inductance is known in the art (for example, see U.S. Patent 2,966,647 by J. J. Lentz, entitled "Shielded Superconductor Circuits"). However, the second embodiment of the invention shows how the transmission lines of the present invention can conveniently be combined with doubly shielded circuitry.

In order to show more clearly a correspondence between the second embodiment of the invention and the first embodiment of the invention certain components in the second embodiment of the invention are designated by the same numerals which were used to designate similar components in the first embodiment of the invention; however, the numerals which are used to designate components of the second embodiment of the invention are followed by a prime notation.

FIGURE 4 shows two transmission lines 401 and 402 connected to the ends of a control line 21′ and two transmission lines 403 and 404 connected to the ends of a gating element 20′. Each of the transmission lines 401 to 404 is similar to transmission line 10 previously described relative to the first embodiment of the invention. The cryotron which includes gating element 20′ and control line 211 has a shield 406 on the bottom thereof and a shield 407 on the top thereof, that is, it is doubly shielded.

The top segment (segment 14A′) of the shield of each of the transmission lines 401 to 404 is extended and these segments merge at the junction of the transmission lines to form shield 407 which covers the top of the cryotron. The manner in which the top segment of the shield of each of the transmission lines merges into shield 407 at the point where control 21′ crosses gate 20′ is clearly shown in FIGURE 5 which is a cross section view taken along line 5—5 in FIGURE 4.

In this second embodiment of the invention a signal is propagating along the first transmission line (composed of transmission lines 401 and 402 and control 21′) and it controls the state of cryotron gate 20′ thereby controlling the signals which propagate in the second transmission line (which is composed of transmission lines 403 and 404 and gate 20′).

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconducting transmission line comprising
a superconducting conductor comprising a first plurality of superconducting strips,
a superconducting shield comprising a second plurality of superconducting strips which are connected along the length of said line, said second plurality of strips being interleaved with said first plurality of strips, and
electrical insulating material between the interleaved portions of said strips,
said superconducting shield completely enclosing said first plurality of strips.

2. A superconductive transmission line comprising a superconductor having a first plurality of strips which are connected along the length of said line,
a superconductive ground plane adjacent said first plurality of strips,
a second superconductor having a second plurality of strips which are connected along the length of said transmission line and which are interleaved with said first plurality of strips,
said second connected plurality of strips being connected along the length of the line to said ground plane to form an enclosure surrounding said first plurality of strips.

3. A superconductive transmission line comprising
a first superconductor having an E shaped cross-section,
a superconducting ground plane adjacent said first superconductor,
a second superconductor having an E shaped cross-section with the arms of such E being interleaved with and insulated from the arms of said first E shaped conductor, said interleaving being along the length of said transmission line,
said second superconductor being connected to said ground plane at its longitudinal edges along the length of said transmission line so as to form an enclosure surrounding said first plurality of strips.

References Cited in the file of this patent

UNITED STATES PATENTS

| | | |
|---|---|---|
| 2,376,307 | Bosch | May 15, 1945 |
| 2,969,421 | Scott | Jan. 24, 1961 |

FOREIGN PATENTS

| | | |
|---|---|---|
| 1,000,543 | Germany | Jan. 10, 1957 |